Oct. 23, 1962     S. N. BLACKMAN ET AL     3,059,639
HYPODERMIC SYRINGE AND METHOD OF MAKING SAME
Filed Oct. 27, 1959
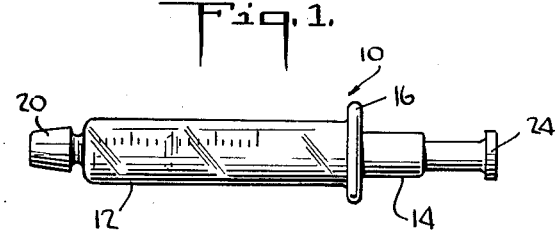
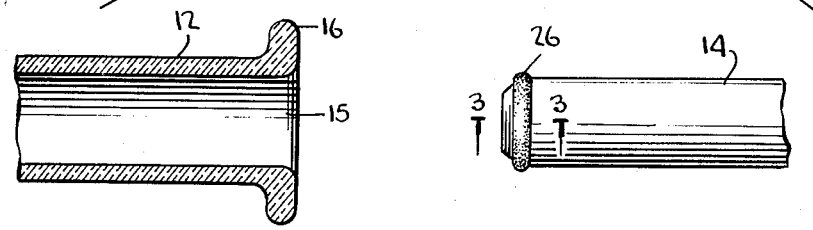
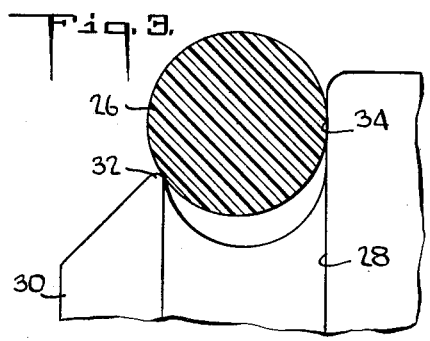
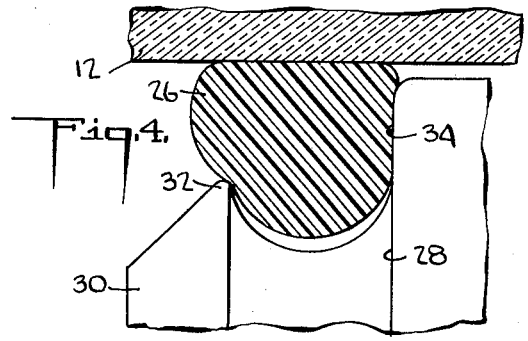
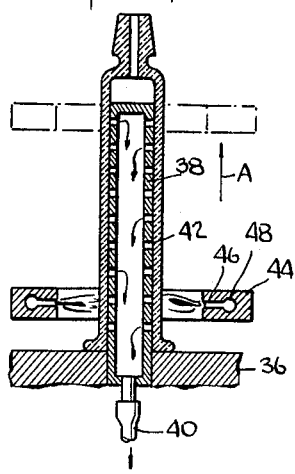
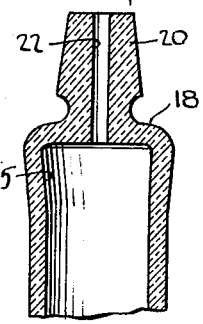
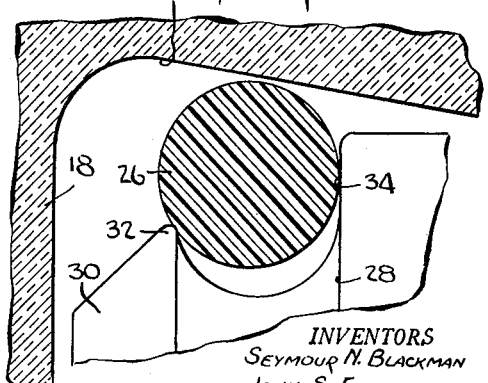
INVENTORS
SEYMOUR N. BLACKMAN
JOHN S. FERENC
BY
ATTORNEYS _United States Patent Office_ 3,059,639
Patented Oct. 23, 1962

3,059,639
HYPODERMIC SYRINGE AND METHOD OF
MAKING SAME
Seymour N. Blackman, Englewood, and John S. Ferenc,
Clifton, N.J., assignors to Precision Medical Instrument, Inc., a corporation of New Jersey
Filed Oct. 27, 1959, Ser. No. 848,963
5 Claims. (Cl. 128—218)

This invention relates to a hypodermic syringe and to a method of making the same.

For many years both the pistons and barrels of hypodermic syringes have been made of glass and, in order to secure the very close match in diameters necessary to create the desired high pressures under the pistons, the pistons and barrels have been individually hand-fitted, that is to say, pistons and barrels have been individually paired. As a result glass pistons and barrels have for many years been made by what amounted almost to hand production. They have not been produced by assembly line means, i.e., by mass production, because the pistons and barrels could not be made interchangeable.

Many efforts have been made to create a production process which would embody the principle of interchangeability, but to date they have been only partially successful. For example, it has been proposed to manufacture the barrels by the well known shrinking process pursuant to which the tolerances of the barrels could be held to extremely small figures—within the range required for interchangeability without loss of pressure. But close tolerances for the barrels alone was not sufficient without correspondingly close tolerances in the manufacture of the pistons and this could be accomplished only with some difficulty.

It has also been proposed to employ natural and synthetic rubber heads on pistons, and natural and synthetic rubber O-rings set in annular grooves in the pistons. These could accomplish interchangeability, but at a price. Natural rubber deteriorated under the conditions to which a syringe was subjected during a heat sterilization. Natural and synthetic rubbers furthermore were attacked by some of the chemicals to which a syringe was exposed in normal use and sterilization. Moreover, natural rubber tended to swell with usage and to lose its resilience. Furthermore natural and synthetic rubbers had a high static coefficient of friction as well as a high kinetic coefficient of friction, both of these rendering manipulation of the syringe unnecessarily difficult. Impregnated and applied lubricating oils rapidly disappeared upon repeated sterilizations.

It is an object of our invention to provide a fully interchangeable syringe which is not subject to any of the foregoing drawbacks.

It is another object of our invention to provide a syringe of the character described which is of extremely simple construction, that is to say, secures the desired interchangeability without undesirable complexity.

It is another object of our invention to provide a syringe of the character described which can be made by mass production methods, which can be assembled by comparatively unskilled labor, which is inexpensive, and which is rugged and foolproof.

It is another object of our invention to provide a syringe of the character described which requires no special handling, that is to say, which is insensitive to any conventional treatment occurring in the normal use of a syringe, so that it does not have to have new procedures established for protective purposes.

It is another object of our invention to provide a syringe of the character described which is not subject to certain serious defects of the conventional all-glass syringe, for example, a syringe which will not blow out during sterilization or from exposure to freezing temperatures.

It is another object of our invention to provide a syringe of the character described in which the piston will not slip out from the barrel accidently.

It is another object of our invention to provide a syringe of the character described in which the sliding seal between the piston and the barrel not only does not worsen with wear but indeed improves, although it is excellent even at its first use.

Other objects of our invention in part will be obvious and in part will be pointed out hereinafter.

Our invention accordingly consists in the features of construction, combinations of elements and arrangements of parts which will be exemplified in the syringe hereinafter described and of which the scope of application will be indicated in the appended claims.

In the accompanying drawings in which is shown one of various possible embodiments of our invention, FIG. 1 is a plan view of a syringe constructed in accordance with the instant invention;

FIG. 2 is an enlarged, partly sectioned, fragmentary, exploded view of said syringe;

FIG. 3 is a highly enlarged fragmentary sectional view taken substantially along the line 3—3 of FIG. 2, and showing the tip of the piston as it appears when withdrawn from the barrel;

FIG. 4 is a view similar to FIG. 3, but showing the tip of the piston within the barrel;

FIG. 5 is a view similar to FIG. 4, but with the tip of the piston adjacent the bottom of the barrel;

FIG. 6 is a sectional view through the barrel and apparatus used in sizing the same; and FIG. 7 is a longitudinal central sectional view through the lower portion of the barrel after sizing.

Referring now in detail to the drawings, the reference numeral 10 denotes a hypodermic syringe incorporating the present invention. As is customary the syringe includes a barrel 12 and a piston 14. To a large extent the construction of these two members is conventional and will be described herein only for the purpose of completeness and to aid in understanding the invention. Thus the barrel 12 is made of glass, ordinary syringe glass, e.g. non-corrosive glass being utilized. The main part of the barrel constitutes a cylindrical tube, the entrance end 15 of which is open and provided with an outwardly extending flange 16 to aid in manipulation of the syringe. The bottom end of the barrel is closed by a wall 18 formed with a tip 20, said wall and tip being provided with a through passageway 22. It will be appreciated that the particular construction described is typical but not limitative, and our invention may employ any or all of the many variations in syringe barrel construction, as for instance, barrels constituting part of ampules, barrels of metal with glass lining or sleeves, barrels with metal tips, barrels with interlocking tips, barrels with metal finger grips, barrels having all types of markings, barrels of materials other than glass, e.g. plastic, multi-part barrels, etc.

The barrel has a bore of an accurate predetermined size, and in a preferred form of our invention the sizing is accomplished by the well known method of shrinking syringe barrels illustrated and described in U.S. Letters Patent No. 2,684,556 issued to Molinari on July 27, 1954. In this method a glass syringe barrel is slipped over a foraminous hollow metal mandrel, a sub-atmospheric pressure is established within the mandrel and the barrel is subjected to a temperature sufficiently high to soften the same so that the barrel shrinks on to the mandrel, thereby accurately sizing the same. Pursuant to a feature of our present invention we preferably modify this process in a manner which will be described in detail later in this specification. For the present, however, it will suffice to note that we employ the shrinking process to provide a highly accurate and true bore for the barrel.

Moreover, we prefer to leave the internal surface of the glass in a virgin condition, that is to say in its original state although not in its original size. For instance, we prefer not to grind, roughen, etch or otherwise frost the internal surface of the barrel even if subsequently we shrink the same and secure a substantially smooth surface. Our invention operates in its most satisfactory form when the internal surface is in its smoothest state and this most easily is accomplished with a virgin glass surface.

The plunger 14 may be made in any suitable manner and in accordance, for example, with standard constructions, save for a single exception which constitutes one of the principal features of the present invention. Thus, the plunger simply may comprise a rod of a synthetic plastic, e.g. nylon, that is to say a polyamide synthetic resin, shaped to a small enough diameter to be freely admitted within the syringe barrel and including an enlarged head 24 to facilitate manual manipulation. The plunger can be of any other alternate mechanical construction and of any other suitable material. For example, we may employ the types of plungers used in ampule syringes or we may use vernier plungers. Likewise we may employ glass or metal plungers or plungers of other synthetic plastics which can safely be subjected to sterilization and other treatments to which a syringe is exposed.

In accordance with the aforesaid feature of the present invention the syringe plunger includes an annular ridge adjacent the tip of the plunger and which is fabricated from a fluorocarbon synthetic resin, e.g. tetrafluoroethylene or fluorinated ethylene propylene, this type of resin commonly being known as Teflon, a registered trademark of E. I. du Pont de Nemours & Company (Inc.), Wilmington, Delaware, for its fluorocarbon resins. The preferred resin is a tetrafluoroethylene resin. The periphery of the ridge is of substantially true circular contour, whereby it will match in configuration the substantially true circular cross-section of the inner surface of the barrel. Preferably the external diameter of the ridge when solidly supported by the piston does not exceed the inner diameter of the barrel by more than two-thousandths (0.002") of an inch on the radius.

We have discovered that the physical characteristics of fluorocarbon resins lend themselves uniquely to use at this point of a syringe, that is to say at the sliding seal between the plunger and the barrel. Thus the fluorocarbon resin ridge is thermally stable up to at least 350° Fahrenheit dry heat, this being the usual dry heat sterilization temperature. The coefficient of friction of fluorocarbon resins against highly polished surfaces such, for instance, as polished steel, is extremely low, e.g. 0.02 as compared, for instance, to the coefficient of friction of graphite and molybdenum disulfide against polished steel which is more than four times as great, so that a fluorocarbon resin plunger takes much less effort to overcome both the static and kinetic frictions engendered between the ridge and the barrel. Fluorocarbon resins are chemically inert to parenteral medication and to other materials with which the ridge is likely to come in contact in the use of the syringe as, for instance, glass, synthetic plastics and chemical sterilizing and cleaning solutions. Fluorocarbon resins have a high flex life so that the fluorocarbon resin ridge can be repeatedly relaxed and compressed and still retain its ability to be autogenously biased against the internal walls of the barrel. Fluorocarbon resins are chemically stable so even if the fluorocarbon resin ridge is accidentally subjected to any of the many chemicals present in a hospital or a doctor's office and to which it would not normally be exposed, it will be unharmed. Fluorocarbon resins have an infinitely small water absorption so that the fluorocarbon resin ridge, even if soaked for protracted periods of time, will not have water incorporated therein and thereby become unsterile or swollen. Fluorocarbon resins also do not absorb vegetable oils, these being common dispersants for parenteral medication, and thereby the fluorocarbon resin ridge will, as in the case of water, not tend to take on these liquids which are a possible source of contamination and swelling. Fluorocarbon resins are comparatively soft, having a durometer measurement, for example, in the order of 40 to 70 so that the fluorocarbon resin ridge can without great difficulty and despite its necessary oversize readily be inserted into the smaller barrel. Fluorocarbon resins have a good plastic memory and reasonably rapid recovery, so that when deforming stresses imposed on the fluorocarbon resin ridge are removed and also when the ridge is subjected to the elevated temperature of sterilization the ridge will after use automatically be restored to its oversize dimensions. Fluorocarbon resins are non-toxic, whereby the fluorocarbon resin ridge will not introduce any harmful effects. Fluorocarbon resins, under the conditions of use of a syringe, are ablating, whereby the fluorocarbon resin ridge when it slides within a barrel will shed an infinitesimal portion of its substance to leave a film of fluorocarbon resin on the interior of the syringe barrel which will act as a lubricant, and which will remain on the walls of the barrel throughout sterilization and cleaning processes, unlike oil lubricating films as, for example, mineral oil films.

It is within the scope of our invention to employ a plunger 14 which is fabricated entirely from a fluorocarbon resin, the body of the plunger being sufficiently stiff for manipulation, despite the flexibility of fluorocarbon resins, because of its bulk, and the annular ridge adjacent the tip being in one piece with the body. Under such circumstances the cross section of the ridge taken along a plane including the central line of the plunger may be arcuate or polygonal and the ridge desirably will protrude from the body of the plunger a distance in the order of four-thousandths (0.004") of an inch on the radius, compressing to a protrusion in the order of two-thousandths (0.002") of an inch on the radius after introduction into the barrel. It is within the scope of our invention to employ far greater protrusions.

Alternatively, the plunger proper, i.e. the major portion or body of the plunger, may be made of glass, synthetic plastics, e.g. nylon, or metal and the forward end may be fabricated from a fluorocarbon resin, said forward end including a fluorocarbon resin ridge as described hereinabove in one piece with said end. Such an end is suitably secured to the body of the plunger as with adhesive, or mechanically, e.g. by a screw force or snap fit.

Although a fluorocarbon resin ridge in one piece with a supporting member that either constitutes the plunger or forms a part of the plunger, including the forward portion, yields satisfactory results, the best effects are secured where the fluorocarbon resin seal is achieved through the use of a fluorocarbon resin, preferably a tetrafluoroethylene resin, O-ring 26 seated in an annular groove 28 immediately in back of the forward end 30, i.e. the tip, of the plunger.

The O-ring 26 can be fully, i.e. solidly, seated in the groove and in this case will be substantially the equivalent of a ridge in one piece with the body of the plunger. Under these conditions we prefer that the oversize of the ring with respect to the barrel not exceed two-thousandths (0.002") of an inch on diameter, that is to say, that the external diameter of the solidly seated ring be greater by not more than two-thousandths (0.002") of an inch than the internal diameter of the barrel. It will be appreciated that either when the fluorocarbon resin ridge is in one piece with the plunger or a substantial supporting member forming a part of the plunger, or when the fluorocarbon resin ridge consists of a ring solidly seated in a groove in the plunger, reduction in diameter of the ring to accommodate itself within the slightly smaller barrel is accomplished principally by compression of the rings unaccompanied by deflection.

We have discovered that we can minimize the force required to reduce the outer diameter of the O-ring and, at the same time, retain an excellent sliding seal between the O-ring and the barrel on the one hand and the O-ring and the plunger on the other hand by interrelating the relative dimensions of the O-ring 26 and the groove 28 in a certain manner that enables the ring to deflect. More specifically, in accordance with a further feature of our invention we make the O-ring too large for the groove. This oversize of the O-ring is dual in nature, that is to say, firstly the inner diameter of the O-ring is made greater than the inner diameter of the groove so that in idle condition (no inwardly compressive force applied), the O-ring is not solidly seated in the groove. Secondly, the thickness of the O-ring is made greater than the width of the groove. Thereby, when the O-ring is in position and the plunger has been withdrawn from the barrel, the O-ring and plunger will have the appearance shown in FIGURE 3. It will there be seen that the O-ring is too large thickness-wise to fit into the groove. Moreover, its inner diameter at this time is in excess of the minimum diameter of the groove. Furthermore, its outer diameter is greater than the outer diameter of the plunger. Desirably, the protrusion of the O-ring from the plunger, this protrusion constituting the annular fluorocarbon resin ridge before mentioned, is such that when the plunger is inserted in a barrel, as shown, for example, in FIGURE 4, and the O-ring thereby constricted, it will not fully seat in the annular groove. We do not mean to imply by the above description that our invention will not function effectively if the O-ring does seat fully in the groove upon an insertion of a plunger into the barrel, provided that no more than two-thousandths (0.002") of an inch of compression on the diameter is required of the O-ring subsequent to solid seating thereof in the annular groove; but we have found that a more easily movable and completely effective sliding seal is achieved without such full seating of the O-ring.

It will be observed that, due to the oversize internal diameter of the O-ring which caused it when idle, and even when engaged with the barrel, to ride above the bottom of the groove, the constriction of the ring to enable it to be admitted into the barrel is in large part due to radially inward deflection of the ring into the groove, thereby permitting variations in the size of the ridge while substantiailly minimizing the compressive stresses in the ring and accordingly minimizing the radial forces developed between the ring and barrel so that ease of manipulation of the syringe is enhanced.

To even further facilitate the ability of the ring to constrict radially, we prefer to shape the groove as best shown in FIGS. 3, 4 and 5. This arrangement is particularly devised to allow a ring of reasonably substantial width to be utilized and, at the same time, to keep comparatively small the amount of protrusion of the ring from the outer diameter of the plunger. The construction we refer to consists in providing a tip 30 of reduced diameter, specifically a tip which at the annular lip 32, where it meets the groove 28, has a diameter smaller than the external diameter of the plunger on the other side of the groove. Such arrangement provides a shoulder 34 on said other side of the groove. It thus will be seen that when the O-ring is placed in the groove and the plunger is out of the barrel, the ring will rest on the annular lip 32 which it overhangs and it also will axially butt against the shoulder 34. Then when the plunger is inserted into the barrel, the ring will tend to deflect radially inwardly along the shoulder 34 deeper into the groove.

Three compressive forces will be developed at such time, one where the overhanging portion of the ring is pressed against the annular lip 32, another where the outer side of the ring is deformed to flatten the same; and the last where a small segment of the ring is squeezed toward the narrow annular space between the plunger and the barrel. These three forces are comparatively mild and do not, due to the permissible deflection, become so substantial as to develop an unreasonably high value for the axial thrust required to move the plunger within the barrel. However, the forces that are developed suffice to seal the joint between the piston, the plunger and the O-ring.

Although we do not mean to imply that any particular dimensions other than those heretofore mentioned are critical, we believe that the invention will be better appreciated if, by way of example,, we recite certain dimensions for a specific size of syringe that embodies our invention. In such a typical syringe the internal diameter of the glass barrel is 0.360". This internal diameter is what we shall refer to as the diameter of the "working section" of the barrel, the latter section to be distinguished from a "relaxation section" which will be described hereinafter and for which typical dimensions will be given. The internal diameter of the working section of the barrel, which was formed by shrinking an untreated glass barrel onto a mandrel, is accurate to within extremely small tolerances, that is to say, tolerances in the order of one ten-thousandth of an inch or less. The diameter of the plunger immediately adjacent the groove is 0.356". The minimum (inner) diameter of the groove is 0.220". The diameter of the annular lip 32 is 0.280". The width of the groove is 0.065", and since the groove is of semi-circular contour, its cross-sectional radius of curvature is 0.0325". The thickness of the O-ring is 0.070", so that it overhangs the annular lip by 0.005". The inner diameter of the O-ring is 0.223" and therefore is 0.003" larger than the groove measured on diameter. The outer diameter of the O-ring is 0.366" so that it protrudes from the plunger 0.010" on diameter.

It should be observed that with the aforesaid dimensions the ring will not fully seat in the groove, being prevented from so doing by the overhang of the annular lip. It should also be pointed out that the clearances, overhangs and protrusions shown in the drawings are not to scale, being deliberately distorted so as to exaggerate, for the purpose of emphasis, the various points above discussed.

Although it is not absolutely essential to permit the ring to relax for satisfactory functioning of the O-ring as a sliding seal between the plunger and the barrel, we have found that better results are obtained if such relaxation is occassionally allowed, and, in particular, allowed when the plunger is bottomed during wet or dry sterilization. Therefore, pursuant to an ancillary feature of our invention, we provide a relaxation section 35 at the bottom of the barrel. Said relaxation section is slightly larger in diameter than the working section. For example, the relaxation section is flared outwardly as exaggeratedly shown in FIGS. 5 and 7. The actual oversize need only be tiny and extend axially of the barrel for a comparatively short distance. For instance, we find that excellent results are secured where the oversize is in the order of 0.001" to 0.004" on radius, the axial length of the oversize being about one-quarter of an inch. When the plunger is pressed home as shown in FIG. 5, the O-ring, with the forces acting thereon released, will quickly expand to approximately its original shape and dimensions. Such relaxation is enhanced by the heat of sterilization.

We have found that the aforesaid oversize of the relaxing section of the barrel can be created simply by a modification of the conventional shrinking process. Referring to FIG. 6 in which we have shown a fragmentary portion of a shrinking apparatus, the reference numeral 36 denotes a rotary table which has it periphery intermittently moved from station to station. Supported at uniformly spaced positions around the periphery of the table are erect hollow mandrels 38 of which only one is illustrated in FIG. 6. The interior of each mandrel is connected to a conduit 40 which when the mandrel is stationary at a certain station is connected to a vacuum pump. The circular side wall of the mandrel is pierced by a large number of tiny openings 42, the size of which have been exaggerated in FIG. 6 so that they would be visible on the scale to which the apparatus has been drawn. The apparatus further includes at one station a flame ring 44 having several radially inwardly directed openings 46 running from a plenum chamber 48. The ring is located concentrically of the mandred at its station and is movable by a mechanism (not shown) in an axial direction as indicated by the arrow A.

As thus far described, the apparatus is conventional. At one station a syringe barrel is placed on the mandrel by the operator, the syringe barrel at this time being slightly oversize. The table then intermittently moves the mandrel from station to station and the barrel is gradually warmed up at said stations. Finally, the barrel reaches the station at which the ring 34 is located and when the flames from the ring are played on the barrel they will raise it to softening temperature.

In a conventional shrinking machine the flame ring 34 is moved between a point adjacent the flange 16 and a point adjacent the bottom wall of the barrel so as to shrink the barrel from the bottom up. We have modified said machine to shorten the movement of the ring so that pursuant to our invention the ring moves between a point adjacent the flange 16 and a point spaced from the bottom wall 18. The latter point is approximately one-quarter of an inch from said bottom wall. Therefore, when the barrel is shrunk onto the mandrel the portion of the barrel which will form the relaxation section is not shrunk but retains its original diameter which is a few thousandths of an inch greater than the diameter to which it is shrunk.

It will be appreciated that syringes utilizing a fluorocarbon resin ridge have many advantages over conventional all glass syringes and over syringes utilizing a natural or synthetic rubber ridge for the sliding seal. For example, the elasticity of a fluorocarbon resin ridge will enable it to maintain a sliding compression seal even when the internal surface of the barrel erodes, as it does during sterilization and after usage, whereas natural and synthetic rubber seals lose their elasticity after repeated sterilizations and become ineffective. The lubricants that are used in present-day syringes, either impregnated or applied, vanish after a few sterilizations so that the rubber ridges stick, whereas the fluorocarbon resin ridges retain their slipperiness after long use. The ablated film deposited on the barrel is not removable by sterilization and in any event is continuously reapplied by ablating action. The fluorocarbon resin ridge makes the two parts of the syringe completely interchangeable so that a syringe embodying our invention lends itself to mass production.

Moreover, with all-glass syringes the problems of sticking often arise due to clotting or solidification of blood or parenteral medicaments in the thin annular space between the plunger and the barrel. This cannot occur in our improved syringe since the fluorocarbon resin ridge wipes the walls of the barrel completely clean as it sweeps down the syringe.

A further difficulty often experienced with glass syringes was blowout, i.e. breakage of the barrel. One type of blowout took place during heat sterilization and was caused by the presence of foreign matter between the plunger and barrel. Some of this material expanded more rapidly than glass and placed a stress on the barrel which caused it to crack or shatter. A second type of blowout was caused by freezing of moisture in the space between the barrel and plunger. Such moisture would solidify when the syringe was exposed to freezing temperatures and likewise crack or burst the barrel. These drawbacks are entirely eliminated by our fluorocarbon resin ridge which when stroked in the barrel leaves an absolutely clean surface behind it, thereby making certain that no moisture or foreign material is left in the space between the barrel and the plunger.

An additional advantage of our syringe is that a piston equipped with a fluorocarbon resin ridge will not accidentally slip out of the barrel.

It thus will be seen that we have provided a syringe and method of making of same which accomplish all the objects of our invention and are well adapted to meet the conditions of practical use.

As various possible embodiments might be made of the above invention and as various changes might be made in the syringe above set forth, it is to be understood that all matter hereinabove described and shown in the accompanying drawings is to be interpreted as illustrative and not in a limiting sense.

Having thus described our invention, we claim as new and desire to secure by Letters Patent:

1. A plunger for a hypodermic syringe having adjacent the tip thereof an annular groove, and a ring of a fluorocarbon resin located in said groove, the outer diameter of the ring being greater than the outer diameter of the plunger, the inner diameter of the ring being greater than the inner diameter of the groove, and the thickness of the ring being greater than the width of the groove.

2. A plunger as set forth in claim 1 wherein the front of the groove is located at an annular lip of lesser diameter than the outer diameter of the plunger.

3. A plunger as set forth in claim 2 wherein the plunger includes a shoulder in back of the groove and against which the ring butts.

4. A barrel for a hypodermic syringe, said barrel having a bore with a closed end and including a working section and a relaxation section, the relaxation section being adjacent the closed end, the diameter of the relaxation section being greater than the diameter of the working section.

5. A hypodermic syringe including a barrel and plunger, said barrel having a working section and a relaxation section, said barrel having a closed end, said relaxation section being adjacent said closed end and of a diameter greater than the diameter of the working section, said plunger having adjacent the tip thereof an annular ridge of a fluorocarbon synthetic resin.

References Cited in the file of this patent

UNITED STATES PATENTS

| | | |
|---|---|---|
| 2,392,104 | Smith | Jan. 1, 1946 |
| 2,607,342 | Abel | Aug. 19, 1952 |
| 2,629,376 | Gallice et al. | Feb. 24, 1953 |
| 2,690,360 | Young | Sept. 28, 1954 |
| 2,709,538 | Harrington | May 31, 1955 |
| 2,729,478 | Chambers et al. | Jan. 3, 1956 |
| 2,735,735 | Abel | Feb. 21, 1956 |
| 2,784,013 | Groen | Mar. 5, 1957 |
| 2,886,034 | Robinson et al. | May 12, 1959 |
| 2,898,167 | Tanner | Aug. 4, 1959 |
| 2,909,398 | Taylor | Oct. 20, 1959 |
| 2,973,978 | Oppenheim | Mar. 7, 1961 |